(12) United States Patent
Thijssen

(10) Patent No.: US 9,891,869 B2
(45) Date of Patent: Feb. 13, 2018

(54) METHOD FOR APPLICATION IN A CUT SHEET PRINTING SYSTEM

(71) Applicant: Océ-Technologies B.V., Venlo (NL)

(72) Inventor: Abraham Thijssen, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/257,570

(22) Filed: Sep. 6, 2016

(65) Prior Publication Data

US 2016/0371038 A1    Dec. 22, 2016

Related U.S. Application Data

(63) Continuation of application No. PCT/EP2015/054473, filed on Mar. 4, 2015.

(30) Foreign Application Priority Data

Mar. 7, 2014    (EP) .................... 14158301

(51) Int. Cl.
| | |
|---|---|
| G06F 15/00 | (2006.01) |
| G06F 3/12 | (2006.01) |
| G06K 15/02 | (2006.01) |
| G06K 15/16 | (2006.01) |
| G06K 15/00 | (2006.01) |

(52) U.S. Cl.
CPC .......... *G06F 3/1208* (2013.01); *G06F 3/1252* (2013.01); *G06F 3/1281* (2013.01); *G06F 3/1285* (2013.01); *G06K 15/021* (2013.01); *G06K 15/16* (2013.01); *G06K 15/4065* (2013.01)

(58) Field of Classification Search
CPC combination set(s) only.
See application file for complete search history.

(56) References Cited

U.S. PATENT DOCUMENTS

2009/0251716 A1*  10/2009  Igarashi ............... G03G 15/655
                                                                  358/1.12
2014/0043624 A1*  2/2014   Wang .................... G06F 3/1215
                                                                  358/1.8

FOREIGN PATENT DOCUMENTS

| JP | 2001-127947 A | 5/2001 |
| JP | 2007-084223 A | 4/2007 |
| WO | WO 2011/065172 A1 | 6/2011 |

* cited by examiner

*Primary Examiner* — Helen Zong
(74) *Attorney, Agent, or Firm* — Birch, Stewart, Kolasch & Birch, LLP

(57) ABSTRACT

A method is provided for printing a digital document on a plurality of cut sheets arranged in a cut sheet printing sequence order resulting in at least one reader spread in an end product, each cut sheet having a first side and a second side, the at least one reader spread consisting of two neighboring sides, each neighboring side of which is of a different cut sheet of the plurality of cut sheets and is intended to be printed upon by a digital page image of the digital document. The method includes the step of, for each reader spread in an end product, printing each digital page image corresponding to the reader spread on the first side of the corresponding cut sheet or printing each digital page image corresponding to the reader spread on the second side of the corresponding cut sheet. A cut sheet printing system is configured to apply the method.

17 Claims, 9 Drawing Sheets

METHOD FOR APPLICATION IN A CUT SHEET PRINTING SYSTEM

CROSS-REFERENCE TO RELATED APPLICATIONS

This application is a Continuation of International Application No. PCT/EP2015/054473, filed on Mar. 4, 2015, and for which priority is claimed under 35 U.S.C. §120. PCT/EP2015/054473 claims priority under 35 U.S.C. §119(a) to Application No. 14158301.3, filed in Europe on Mar. 7, 2014. The entire contents of each of the above-identified applications are hereby incorporated by reference into the present application.

BACKGROUND OF THE PRESENT INVENTION

1. Field of the Invention

The present invention relates to a method for printing a digital document by a cut sheet printing system on a plurality of cut sheets, resulting in an end product having a reader spread formed by two opposing sheets of the plurality of sheets, each cut sheet of the plurality of sheets having a first side and a second side, the first side having a first print characteristic and the second side having a second print characteristic different from the first print characteristic. As is well known, a reader spread comprises at least a part of each of two neighboring sides and each of the neighboring sides is a side of a different sheet of the plurality of sheets.

The present invention further relates to a cut sheet printing system configured to perform the method according to the present invention.

2. Description of Background Art

Printing systems for digital cut sheet printing are nowadays also used for printing books and other documents having both sides of the sheets printed upon with images. Such a printing system may comprise a tandem construction of two print engines or two print heads, each print engine or print head printing on one predetermined side of the cut sheets. The cut sheets are separated from a media input holder with one predetermined side upwards. On the other hand, such a printing system may comprise a turning-over unit for turning over a cut sheet between a first printing action of printing on one side of the cut sheet and a second printing action of printing on the other side of the cut sheet. The first printing action and the second printing action may be done by a same print head or print engine or by different print heads or print engines. The cut sheets are printed in a cut sheet printing sequence order. If, for example a book is printed, the pages 1 and 2 may be printed on sides of a first cut sheet, the pages 3 and 4 may be printed on sides of a second cut sheet after printing of the pages 1 and 2, etc. If, for example a booklet or a signature is printed comprising an even number n of pages, the pages 1 and n may be printed on a first side of a cut sheet, the pages 2 and n−1 may be printed on a second side of the same cut sheet, and the cut sheet may be folded in half later on after printing on the cut sheet has finished.

FIG. 4 illustrates an example of a print sequence of cut sheets for duplex printing and a corresponding reader spread in the end product according to the background art. FIG. 7 shows an example of a diagram of a background art method for duplex printing of cut sheets.

FIG. 4 illustrates a print sequence PS of sides of cut sheets numbered 1 and 2 for duplex printing on both sides of the cut sheets 1, 2. The cut sheet numbered 1 has a front side indicated by the text "1: front" and a back side indicated by the text "1: back" and provided with the number "2." The cut sheet numbered 2 has a front side indicated by the text "2: front" and a back side indicated by the text "2: back." The plurality of images to be printed in an end product on subsequent pages on both sides of the cut sheets 1 and 2 are the images provided with large numbers "1", "2", "3" and "4." The print order of the plurality of images will now be explained in combination with a flow diagram of a method according to the background art as shown in FIG. 7. A starting point A leads to a first step S1.

According to the first step S1 the cut sheet numbered 1 is separated from the input holder of a cut sheet printing system and transported to the print engine.

According to a second step S2, a bitmap representing the large number "1" is printed upon the front side of the cut sheet numbered 1.

According to a third step S3, the cut sheet numbered 1 is transported to a known duplex print loop module and is turned by the duplex print loop module.

According to a fourth step S4, the cut sheet numbered 1 is transported again to the print engine and a bitmap representing the large number "2" is printed upon the back side of the cut sheet numbered 1.

According to a fifth step S5, the cut sheet numbered 1 is deposited in an output holder of the cut sheet printing system.

According to the sixth step S6, the cut sheet numbered 2 is separated from the input holder of the cut sheet printing system and transported to the print engine.

According to a seventh step S7, a bitmap representing the large number "3" is printed upon the front side of the cut sheet numbered 2.

According to an eighth step S8, the cut sheet numbered 2 is transported to the duplex print loop module again and is turned by the duplex print loop module.

According to a ninth step S9, the cut sheet numbered 2 is transported again to the print engine and a bitmap representing the large number "4" is printed upon the back side of the cut sheet numbered 2.

According to a tenth step S10, the cut sheet numbered 2 is deposited in the output holder of the cut sheet printing system. The method ends in an end point B.

The steps S1-S5 may be executed in parallel or interleaved with the steps S6-S10.

The resulting reader spread RS (See FIG. 4) shows that the two subsequent pages having the prints of the bitmaps representing the numbers "2" and "3" form a reader spread. The first page of this reader spread with the number "2" is printed on the back side of the cut sheet numbered 1, while the second page of this reader spread with the number "3" is printed on the front side of the cut sheet numbered 2. The reader spread is printed on sides of different print characteristics.

After printing of all the cut sheets, the printed cut sheets may be gathered into a printed document. The printed document comprises two-page spreads in which the left part of the spread is printed on the first side of a cut sheet, while the right part of the spread is printed on the second side of another cut sheet. A reader spread may usually be printed on cut sheets, which are subsequent in the cut sheet printing sequence order.

Since the first side of a cut sheet has a different print characteristic than the second side of a cut sheet, a print quality consistency difference, like a color consistency difference, may appear in the printed document, especially in a reader spread.

SUMMARY OF THE PRESENT INVENTION

It is an objective of the present invention to provide a method for reaching a print quality consistency in a reader spread within a document to be printed on a cut sheet printing system.

According to the present invention, the object is achieved by a method comprising the step of printing each digital image of the digital document intended to be printed on the reader spread in the end product on the side of the corresponding cut sheet of the reader spread that has the first print characteristic, or printing each digital image of the digital document intended to be printed in the reader spread in the end product on the side of the corresponding cut sheet of the reader spread that has the second print characteristic.

By doing so, a consistent print quality in a two-page spread of a document is achieved, since the print characteristics of the sides in the reader spread are the same.

According to an embodiment, a first digital image of the digital document is assigned to be printed on the first side of a cut sheet of the plurality of cut sheets and a second digital image of the digital document is assigned to be printed on the second side of the cut sheet, and the plurality of cut sheets is arranged in a cut sheet printing sequence order, the method comprising the steps of printing the first digital image and the second digital image, respectively, on either side of the cut sheet, wherein the step of printing on the cut sheet comprises the steps of, if the cut sheet is of a first mathematical parity in the cut sheet printing sequence order, printing the first digital image on the first side of the cut sheet, and printing the second digital image on the second side of the cut sheet, and, if the cut sheet of a second mathematical parity in the cut sheet printing sequence order, the second mathematical parity being other than the first mathematical parity, printing the second digital image on the first side of the cut sheet, and printing the first digital image on the second side of the cut sheet.

In a document with subsequent reader spreads like a 1-up document, 2-up document, a booklet or a signature, two pages of the document determines one side of a reader spread and the other side of a reader spread. The two pages may be subsequent in case of a 1-up document, or complementary with respect to the number of pages in case of a 2-up document or a signature. By applying the method, the digital images corresponding to a reader spread are printed on the first side of each of the two sheets in the reader spread in case the cut sheet is of a first mathematical parity in the cut sheet printing sequence order or on the second side of each of the two sheets in the reader spread in case the cut sheet is of a second mathematical parity in the cut sheet printing sequence order. This means that, in a first example, the digital images corresponding to a reader spread are printed on the first side of each of the two sheets in the reader spread in case of an even cut sheet in the cut sheet printing sequence order or on the second side of each of the two sheets in the reader spread in case of an odd cut sheet in the cut sheet printing sequence order. This means that, in a second example, the digital images corresponding to a reader spread are printed on the first side of each of the two sheets in the reader spread in case of an odd cut sheet in the cut sheet printing sequence order or on the second side of each of the two sheets in the reader spread in case of an even cut sheet in the cut sheet printing sequence order.

According to an embodiment, the method comprises the steps of, for a cut sheet of the first mathematical parity, swapping the first and second digital image of the cut sheet before printing the cut sheet and turning the cut sheet with respect to the first side and the second side after printing on the first and second side of the cut sheet. The swapping step of the first and second digital image intended to be printed on the cut sheet of the first mathematical parity may be achieved in several ways. If a control unit of the cut sheet printing system receives a digital document in a PDL language, which is sent to a RIP rasterizer, the ripped image is stored in a set memory, and the stored ripped image is sent to the print head or marking print engine, two scenarios may be followed to print a page 2 on the first side of a cut sheet and a page 1 on the second side of a cut sheet. According to a first scenario, the RIP rasterizer processes the PDL document in a normal order to the set memory, resulting in a first bitmap for page 1 and a second bitmap for page 2 in the set memory. The print head or marking print engine first reads the second bitmap from set memory for printing and then reads the first bitmap from set memory for printing. According to a second scenario, the RIP rasterizer first processes page 2 and then page 1 as indicated by the control unit of the cut sheet printing system. Page 2 is stored in set memory for printing on the first side of the cut sheet and page 1 is stored in set memory for printing on the second side of the cut sheet.

The turning step is turning the cut sheet along an axis in the cut sheet plane. The axis may be a line through mid points of opposing edges of the cut sheet. The turning step is done in order to deposit the cut sheets of the first mathematical parity in a correct order in an output station with respect to the right reader sequence of the printed document. The swapping of the corresponding bitmaps is controlled by a control unit of the cut sheet printing system.

According to an embodiment, the method comprises the steps of, for a cut sheet of the first mathematical parity, turning the cut sheet with respect to the first side and the second side before printing on the first and second side of the cut sheet. This is advantageous if swapping of bitmaps as in the previous embodiment is to be avoided. The turning step is turning the cut sheet along an axis in the cut sheet plane. The axis may be a line through mid points of opposing edges of the cut sheet.

According to an embodiment, the turning of the cut sheet is achieved by a duplex loop module. For duplex printing, i.e. printing on both sides of a cut sheet, a skilled person may use a duplex loop module. The duplex loop module is configured to turn the cut sheet after one side of the cut sheet has been printed upon and before the second side of the cut sheet is printed upon. The duplex loop module is part of a paper path for the cut sheets through the cut sheet printing system. The duplex loop module may also be used for the additional turning of the cut sheet for applying the method of the present invention.

According to an embodiment, the first print characteristic and the second print characteristic are determined by a media characteristic of the cut sheet. Such a media characteristic is a print characteristic determined a priori to printing. A cut sheet may have a first (physical front) side and a second (physical back) side, which are different for the resulting prints on the first and second side of the cut sheet. Since most cut sheets are positioned in a package of sheets, such a media characteristic may be due to the position in the package, for example an upside of each sheet in the package has the first print characteristic while a downside of each sheet in the package has the second print characteristic. A media characteristic may be an adhesiveness for recording material like an ink or toner to the cut sheet medium, which is different for a physical front side and a physical back side of the cut sheet. The print characteristic of a cut sheet, which is determined by the media characteristic, is already determined before any image has been printed on the cut sheet.

According to an embodiment, the first print characteristic and the second print characteristic are determined by a difference in the print process and print interaction between printing on the first side of the cut sheet and printing on the second side of the cut sheet. Such a print characteristic is a print characteristic determined a posteriori to printing. Such a print characteristic may be established after tests of printing cut sheets by the cut sheet printing system. The print process may be such that the first side of a cut sheet is printed by a first print unit, like a print engine or a print head, and the second side of the cut sheet is printed by a second print unit, like a print engine or a print head. By the fact that the first side and the second side are printed by different print units, the print quality of the first side of a cut sheet and a second side of a cut sheet may differ. In a reader spread of a document printed according to the method of the present invention, such a difference is eliminated, since both sides of the reader spread are printed by the first print unit or both sides of the reader spread are printed by the second print unit. For a cut sheet, the printing on the first side of the cut sheet is done by the first print unit and the printing on the second side of the cut sheet is done by the second print unit other than the first print unit.

According to an embodiment, the first print characteristic and the second print characteristic are determined by the sequence order in which the first side and the second side of the cut sheet are printed upon. If, for example, the cut sheet is printed upon one side by a print unit at a certain temperature or at a certain humidity, the printing of the other side of the cut sheet may be done at a different temperature or humidity, respectively, at the same print unit, which may lead to the a print quality difference between the one side and the other side. In another further embodiment for a cut sheet of the plurality of cut sheets the printing on the first side of the cut sheet is done by a first print unit and the printing on the second side of the cut sheet is done by a second print unit other than the first print unit.

According to an embodiment of the method, the digital document is a 2-up booklet or a signature. The method according to the present invention may also be applied to a 2-up booklet or a signature. When the cut sheets of the 2-up booklet or a signature are folded after printing, a reader spread is still on the same side of cut sheet. The digital images of the 2-up booklet or signature intended to be printed on the reader spread in the end product comprise the digital images for at least two pages of the 2-up booklet or the signature.

The present invention also relates to a cut sheet printing system for printing a digital document on a plurality of cut sheets resulting in an end product having a reader spread formed by two opposing sheets of the plurality of sheets, each cut sheet of the plurality of sheets having a first side and a second side, the first side having a first print characteristic and the second side having a second print characteristic different from the first print characteristic, the cut sheet printing system comprising at least one print unit for printing digital images of the digital document on the plurality of cut sheets, a control unit comprising a determining mechanism configured to determine at least one digital image intended to be printed on the reader spread in the end product, and a scheduler configured to schedule each digital image of the digital document intended to be printed in the reader spread in the end product to be printed on the side of the corresponding cut sheet of the reader spread that has the first print characteristic, or to schedule each digital image of the digital document intended to be printed in the reader spread in the end product to be printed on the side of the corresponding cut sheet of the reader spread that has the second print characteristic.

According to an embodiment of the cut sheet printing system, the plurality of cut sheets are arranged in a predetermined cut sheet printing sequence order, and to a cut sheet of the plurality of cut sheets, a first digital image of the digital document is assigned to be printed on the first side of the cut sheet and a second digital image of the digital document is assigned to be printed on the second side of the cut sheet, the printing system comprising a print engine for printing a digital image on a side of a cut sheet of the plurality of cut sheets, a schedule module configured to schedule the plurality of digital images of the document into the predetermined cut sheet printing sequence order, and a turning module configured to turn a cut sheet of a first mathematical parity in the cut sheet printing sequence order with respect to the first side and the second side of the cut sheet after printing on the cut sheet, and wherein the schedule module is configured to swap the first and second digital image assigned to a cut sheet of the first mathematical parity before turning the cut sheet.

According to an embodiment of the cut sheet printing system, the plurality of cut sheets are arranged in a predetermined cut sheet printing sequence order, and to a cut sheet of the plurality of cut sheets, a first digital image of the digital document is assigned to be printed on the first side of the cut sheet and a second digital image of the digital document is assigned to be printed on the second side of the cut sheet, the printing system comprising a print engine for printing a digital image on a side of a cut sheet, a schedule module configured to schedule the plurality of digital images of the document into the predetermined cut sheet printing sequence order, and a turning module configured to turn a cut sheet of a first mathematical parity in the cut sheet printing sequence order with respect to the first side and the second side of the cut sheet before printing on the cut sheet.

According to an embodiment, the cut sheet printing system comprises a duplex loop module for enabling duplex printing of a cut sheet, wherein the duplex loop module comprises the turning module.

The present invention further relates to a non-transitory recording medium comprising computer executable program code configured to instruct at least one computer to perform the method according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
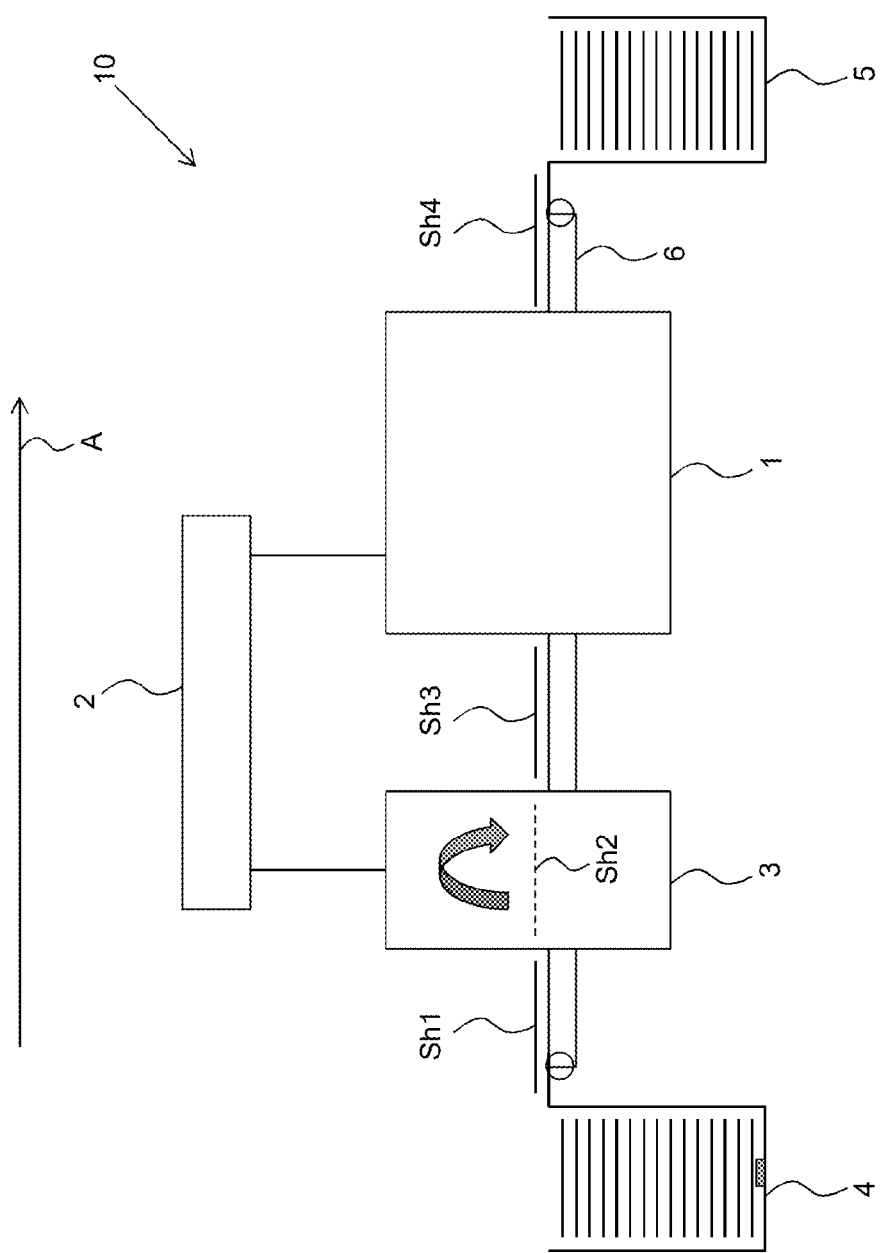
FIGS. 1-3 are schematic configurations of cut sheet printing systems according to the present invention.

The present invention will now be described with reference to the accompanying drawings, wherein the same reference numerals have been used to identify the same or similar elements throughout the several views.

FIG. 1 is a first schematic configuration of a cut sheet printing system 10 according to the present invention. The cut sheet printing system 10 comprises an input holder 4 for holding a plurality of cut sheets and an output holder 5 for holding printed cut sheets. A cut sheet Sh1, Sh2, Sh3, Sh4 is transported along a medium path in a medium transport direction A by means of a transport belt 6 from the input holder 4 to the output holder 5. A finishing module (not shown) may be coupled to the output holder 5 or directly to the transport belt 6 instead of the output holder 5 in order to finish the printed cut sheets into an end product comprising the plurality of reader spreads such as a book. The cut sheet printing system 10 further comprises a turning module 3 for turning a cut sheet according to the method of the present invention and a print engine 1 for printing an image on a side of the cut sheet. The turning module 3 may be configured to turn a cut sheet along an axis through mid points of opposing edges of the cut sheet. The turning module 3 and the print engine 1 are connected to a control unit or controller 2 that is configured to control the turning process and the print process, respectively. In FIG. 1, the turning module 3 is positioned along the medium path before the print engine 1, which is also positioned along the medium path. This means that a cut sheet first arrives at the turning module 3 and thereafter at the print engine 1. The print engine 1 is configured to print an image on at least one side of a cut sheet Sh1, Sh2, Sh3, Sh4. The print engine 1 may be a tandem print engine, which is able to simultaneously print images on both sides of the cut sheet. The print engine 1 may also comprise a print unit and a duplex loop module. The print engine 1 is then configured to print an image on one side of the cut sheet by means of the print unit, to turn the cut sheet by means of the duplex loop modules and offering the cut sheet, which is printed upon on one side, again to the print unit for printing an image on the other side of the cut sheet. The process of twice printing and once turning by means of the print engine 1 is a known process, which is controlled by the control unit 2, which controls the print engine 1.

The process of the additional turning of the cut sheet by the turning module 3 according to the method of the present invention is also controlled by the control unit 2. Besides printing a double sided document, the print engine 1 may also be used to print a single sided document.

In an alternative embodiment of the cut sheet printing system, the turning module 3 is positioned between the input holder 4 and the print engine 1 and an additional input holder is positioned between the turning module 3 and the print engine 1. After a cut sheet has been turned by the turning module 3, the cut sheet is transported to the additional input holder for buffering a stack of cut sheets. Each odd cut sheet is transported from the input holder 4 to the additional input holder without turning the odd cut sheet—bypassing the turning module—and each even cut sheet is transported from the input holder 4 to the additional input holder via the turning module, which turns the even cut sheet. In this way, the stack of cut sheets, which has arrived in the additional input holder, is suitable for printing of the end product with reader spreads according to the method of the present invention.

Figure 2:
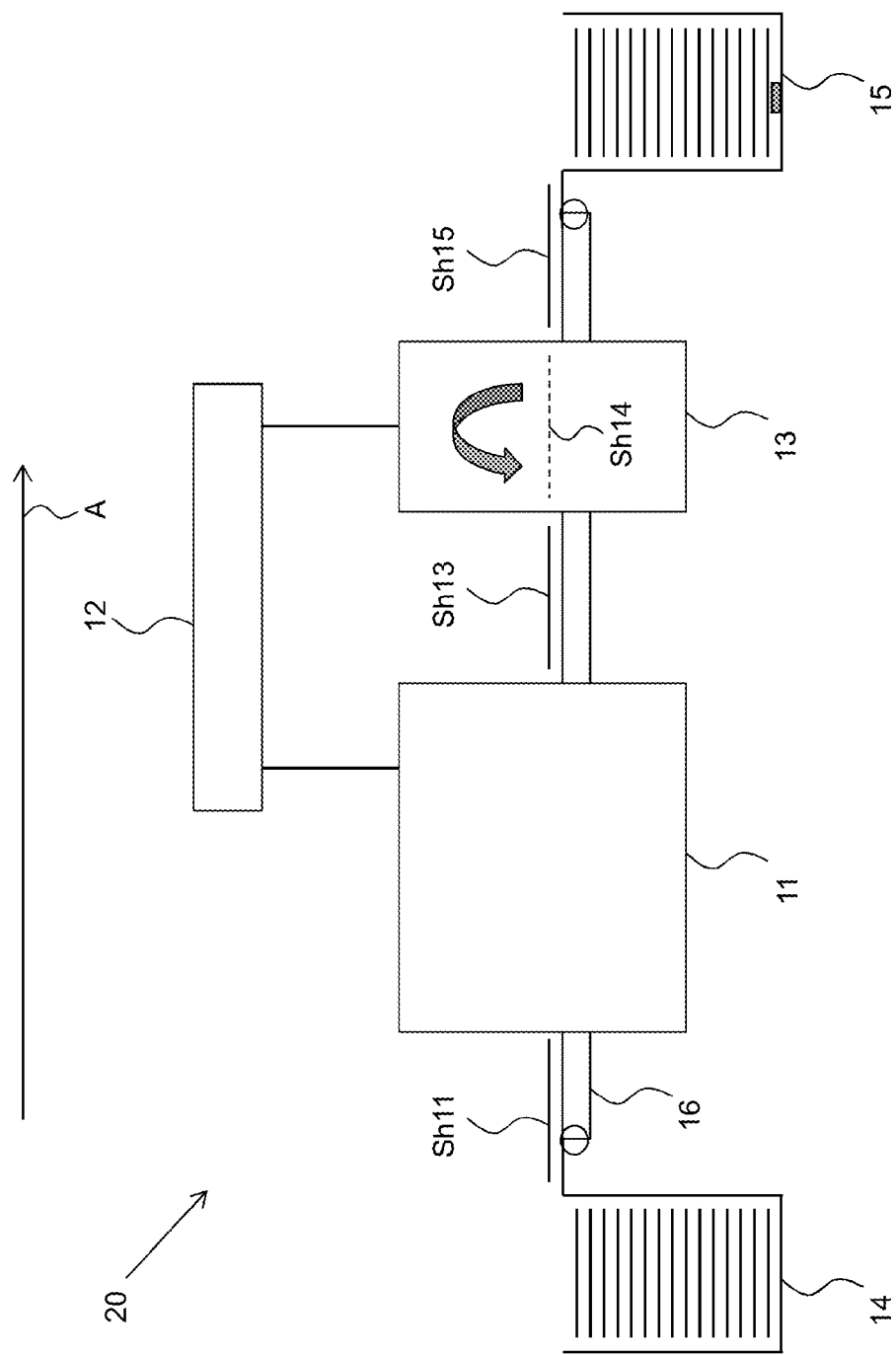

FIG. 2 is a second schematic configuration of a cut sheet printing system 20 according to the present invention. The cut sheet printing system 20 comprises an input holder 14 for holding a plurality of cut sheets and an output holder 15 for holding printed cut sheets. A cut sheet Sh11, Sh13, Sh14, Sh15 is transported along a medium path in a medium transport direction A by means of a transport belt 16 from the input holder 14 to the output holder 15. A finishing module (not shown) may be coupled to the output holder 15 or directly to the transport belt 16 instead of the output holder 15 in order to finish the printed cut sheets into an end product comprising the plurality of reader spreads such as a book. The cut sheet printing system 20 further comprises a turning module 13 for turning a cut sheet according to the method of the present invention and a print engine 11 for printing an image on a side of the cut sheet. The turning module 13 and the print engine 11 are connected to a control unit or controller 12 configured to control the turning process and the print process, respectively. Contrary to FIG. 1, in FIG. 2, the turning module 13 is positioned along the medium path after the print engine 11, which is also positioned along the medium path. This means that a cut sheet first arrives at the printing engine 11 and thereafter at the turning module 13. The print engine 11 is configured to print an image on at least one side of a cut sheet Sh11, Sh13, Sh14, Sh15. The print engine 11 may be a tandem print engine, which is able to simultaneously print on both sides of the cut sheet. The print engine 11 may also comprise a print unit and a duplex loop module. The print engine 11 is then configured to print an image on one side of the cut sheet by means of the print unit, to turn the cut sheet by means of the duplex loop module and offering the cut sheet, which is printed upon on one side, again to the print unit for printing an image on the other side of the cut sheet. The process of twice printing and once turning by means of the print engine 11 is a known process, which is controlled by the control unit 12, which controls the print engine 11.

The process of the additional turning of the cut sheet by the turning module 13 according to the method of the present invention is also controlled by the control unit 12. Besides printing a double sided document, the print engine 11 may also be used to print a single sided document.

Figure 3:
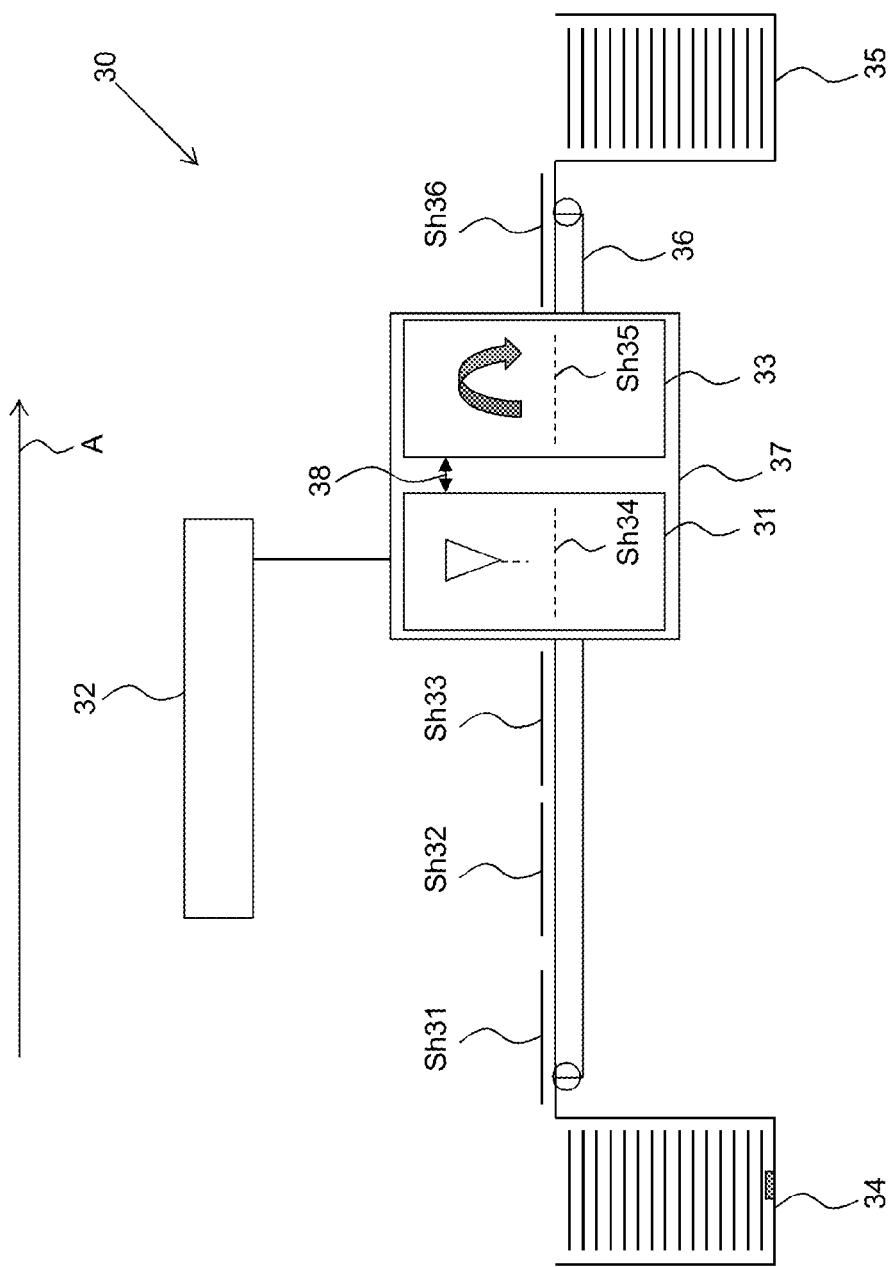

FIG. 3 is a third schematic configuration of a cut sheet printing system 30 according to the present invention. The cut sheet printing system 30 comprises an input holder 34 for holding a plurality of cut sheets and an output holder 35 for holding printed cut sheets. A cut sheet Sh31, Sh32, Sh33, Sh34, Sh35, Sh36 is transported along a medium path in a medium transport direction A by means of a transport belt 36 from the input holder 34 to the output holder 35. A finishing module (not shown) may be coupled to the output holder 35 or directly to the transport belt 36 instead of the output holder 35 in order to finish the printed cut sheets into an end product comprising the plurality of reader spreads such as a book. The cut sheet printing system 30 further comprises a print unit 37. The print unit 37 comprises a turning module 33 for turning a cut sheet when duplex printing on the cut sheet is intended and for turning the cut sheet according to the method of the present invention and a print engine 31 for printing an image on a side of the cut sheet. The turning module 33 and the print engine 31 are connected to a control unit or controller 32 configured to control the turning process and the print process, respectively. The turning of the cut sheet according to the method of the present invention is integrated in the print unit 37. The turning module 33 is used as a duplex loop module for turning the cut sheet in case of duplex printing on both sides of the cut sheet as well as for turning the cut sheet according to the method of the present invention. The double sided arrow 38 between the turning module 33 and the print engine 31 indicates that a cut sheet may be transported from the print engine 31 to the turning module 33 and vice versa when printing on at least one side of the cut sheet. This means that the method according to the present invention can also be applied to a print job, which at least partly consists of cut sheets, which are intended to be printed upon on a single side of a cut sheet. Contrary to FIG. 3, in an alternative embodiment, the print engine 31 is positioned along the medium path after the turning module 33, which is also positioned along the medium path. This means that a cut sheet first arrives at the turning module 33 and thereafter at the print engine 31. The print engine 31 is configured to print an image on at least one side of a cut sheet Sh31, Sh32, Sh33, Sh34, Sh35, Sh36. The print engine 31 may be a tandem print engine, which is able to simultaneously print on both sides of the cut sheet. The print unit 37 uses the turning module 33 as a duplex loop module. The print engine 31 is then configured to print an image on one side of the cut sheet by means of the print unit, to turn the cut sheet by means of the duplex loop module 33 and offering the cut sheet, which is printed upon on one side, again to the print unit for printing an image on the other side of the cut sheet. The process of twice printing and once turning by means of the print engine 31 and the turning module 33 is a known process and controlled by the control unit 32, which controls the print unit 37.

The process of the additional turning of a cut sheet according to the method of the present invention is also controlled by the control unit 32. Besides printing a double sided document, the print unit 37 may also be used to print a single sided document.

The print engine 1, 11, 31 in FIG. 1, FIG. 2 and FIG. 3, respectively, may be an inkjet print engine using ink material to be ejected on a cut sheet medium, an inkjet print engine using ink material to be ejected on an intermediate, which transports the ink material along a cut sheet medium or an electro-photographical print engine using toner material to adhere to the cut sheet medium.

The print engines 1, 11, 31 may be suitable for printing black-and-white images or color images. The medium of the cut sheet may be paper, plastic, or any other suitable receiving medium. In case of an inkjet print engine, the used ink material may be a hot melt ink, a UV curable ink, a water-based ink and/or a latex ink.

Figure 5:
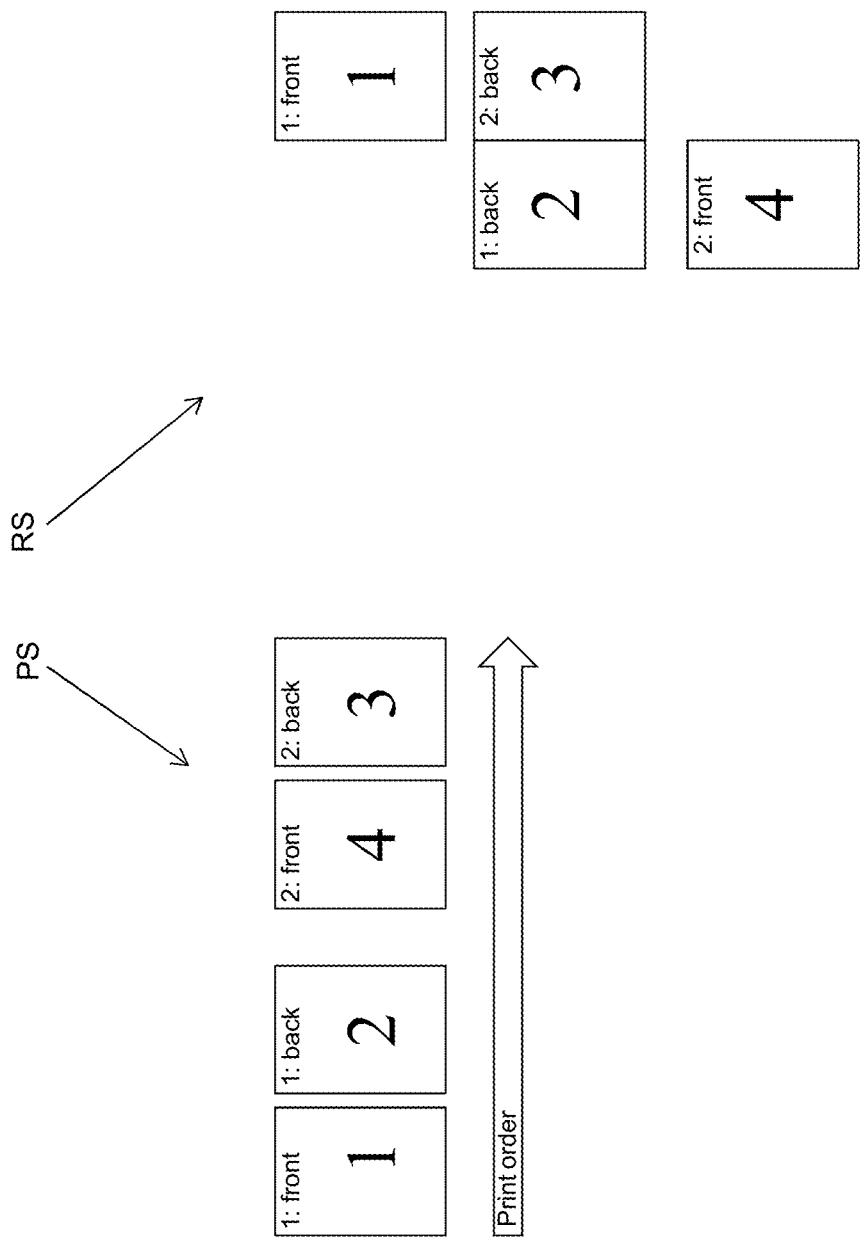
FIGS. 5-6 illustrate print sequences of cut sheets for duplex printing and corresponding reader spreads in the end product according to the method of the present invention.

FIG. 5 illustrates a print sequence PS of sides of cut sheets small numbered 1 and 2 for duplex printing on both sides of the cut sheets small numbered 1, 2. For showing the principle of the method of the present invention, the number of presented cut sheets is equal to 2, but within the scope of the present invention, a larger plurality of cut sheets may be envisioned. The cut sheet small numbered 1 has a front side indicated by the text "1: front" and a back side indicated by the text "1: back" and provided with the number "2". The cut sheet small numbered 2 has a front side indicated by the text "2: front" and a back side indicated by the text "2: back." The plurality of images to be printed in an end product on subsequent pages on both sides of the cut sheets 1 and 2 are the images provided with large numbers "1", "2", "3" and "4", although any other images may be envisioned.

Figure 8:
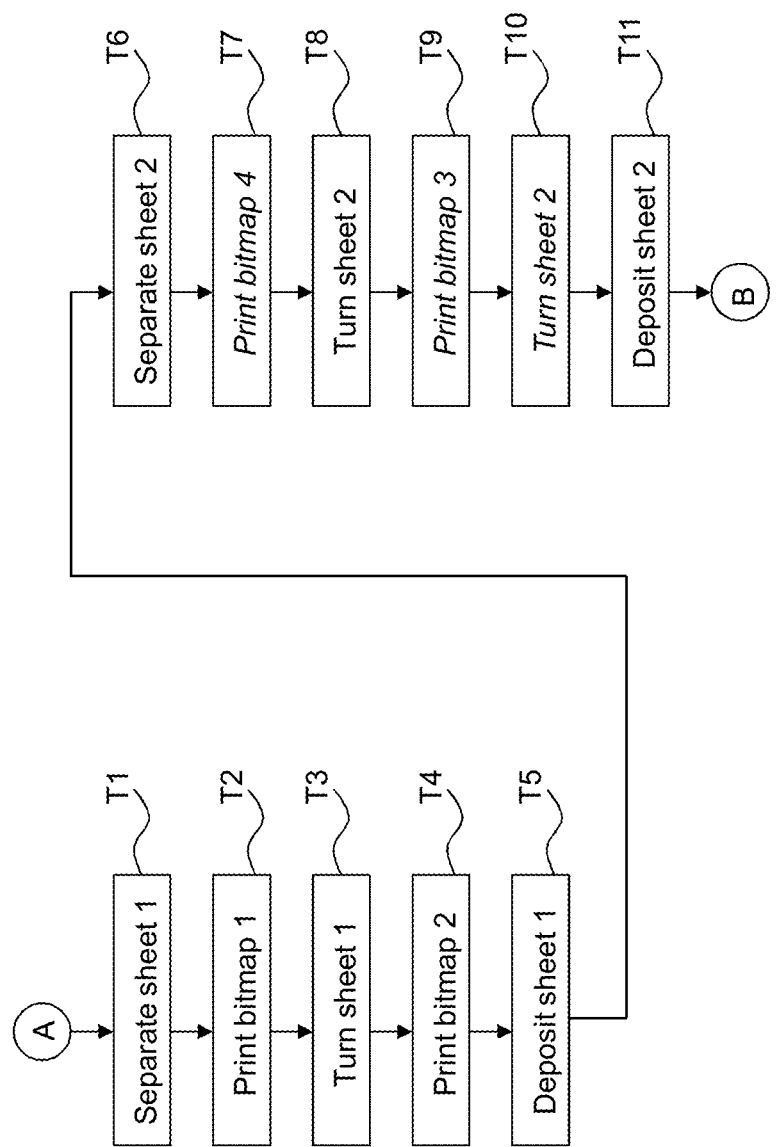
FIGS. 8-9 are diagrams of embodiments of the method according to the present invention.

The print order of the plurality of images will now be explained in combination with a flow diagram of a method according to the present invention as shown in FIG. 8. A starting point A leads to a first step T1.

According to the first step T1, the cut sheet small numbered 1 is separated from the input holder of the cut sheet printing system and transported to the print engine.

According to a second step T2, a bitmap representing the large number "1" is printed upon the front side of the cut sheet small numbered 1.

According to a third step T3, the cut sheet small numbered 1 is transported to the turning module and is turned by the turning module.

According to a fourth step T4, the cut sheet small numbered 1 is transported again to the print engine and a bitmap representing the large number "2" is printed upon the back side of the cut sheet small numbered 1.

According to a fifth step T5, the cut sheet small numbered 1 is deposited in the output holder of the cut sheet printing system.

Figure 7:
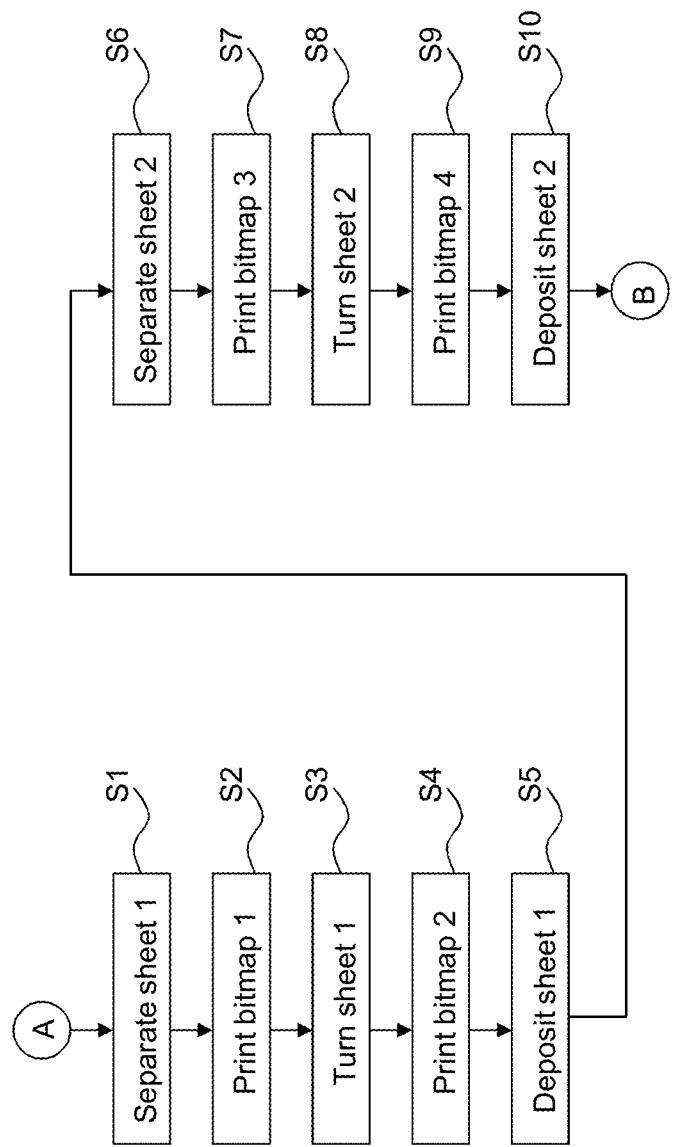
FIG. 7 is a diagram of a background art method for duplex printing of cut sheets.

Steps T1-T5 are equal to the steps S1-S5 in FIG. 7 according to the background art.

According to the sixth step T6, the cut sheet small numbered 2 is separated from the input holder of the cut sheet printing system and transported to the print engine.

According to a seventh step T7, a bitmap representing the large number "4" is printed upon the front side of the cut sheet small numbered 2.

According to an eighth step T8, the cut sheet small numbered 2 is transported to the turning module and is turned by the turning module.

According to a ninth step T9, the cut sheet small numbered 2 is transported again to the print engine and a bitmap representing the large number "3" is printed upon the back side of the cut sheet small numbered 2.

According to a tenth step T10, the cut sheet small numbered 2 is transported to the turning module again and is turned by the turning module.

According to an eleventh step T11, the cut sheet small numbered 2 is deposited in the output holder of the cut sheet printing system. The method ends in an end point B.

Figure 4:
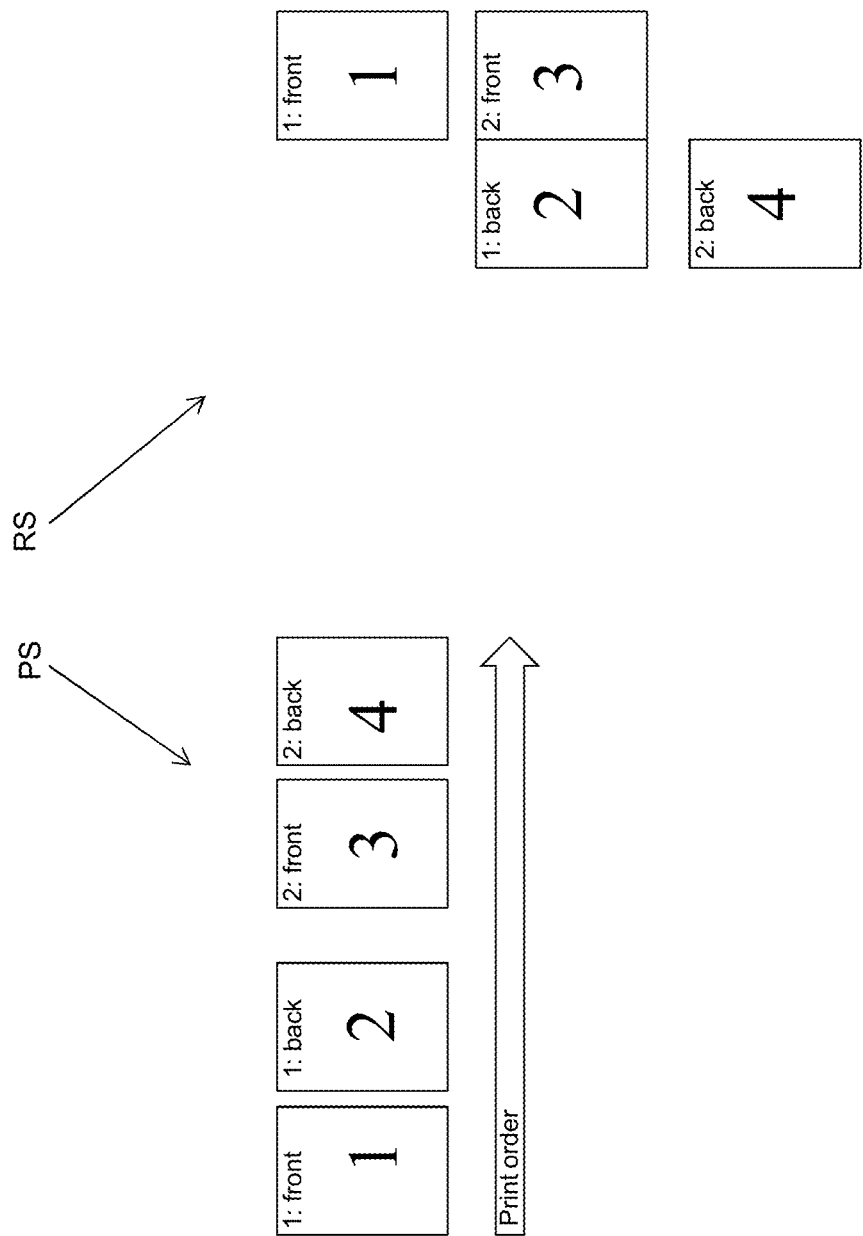
FIG. 4 illustrates a print sequence of cut sheets for duplex printing and a corresponding reader spread in the end product according to the background art.

The turning steps T3 and T8 resemble the turning steps of a usual duplex printing by means of a duplex loop module. The turning step T10 is additional and is necessary since printing steps T7 and T9 of the bitmaps representing the numbers "4" and "3" are swapped in comparison with the normal print steps S7 and S9 in the known print order in the background art case in FIG. 4. The separation step T6 of the cut sheet small numbered 2 may be planned before the printing and turning steps S2-S4 of the cut sheet small numbered 1.

The resulting reader spread RS (See FIG. 5) shows that the two subsequent pages having the prints of the bitmaps representing the numbers "2" and "3" form a reader spread. The two pages of this reader spread are both printed on the back sides of the cut sheets numbered 1 and 2. In this way, the print quality issue due to printing on different sides of a cut sheet has been avoided. The page order of the pages in the resulting document still conforms to the page order as specified in the document specifications, namely a sequence order of "1", "2", "3" and at last "4."

The method according to the present invention also works for 2-up booklets and signatures.

In case of a larger plurality of cut sheets to be printed, the steps T1-T11 may be repeated accordingly. Parallel processing of cut sheets of the plurality may be envisioned. The cut sheet printing systems 20 and 30 in FIG. 2 and FIG. 3, respectively, are configured to execute the steps T1-T11 of the first embodiment of the method according to FIG. 8. The control units 12 and 32 in FIG. 2 and FIG. 3, respectively are programmed to execute the steps T1-T11 according to FIG. 8.

Figure 6:
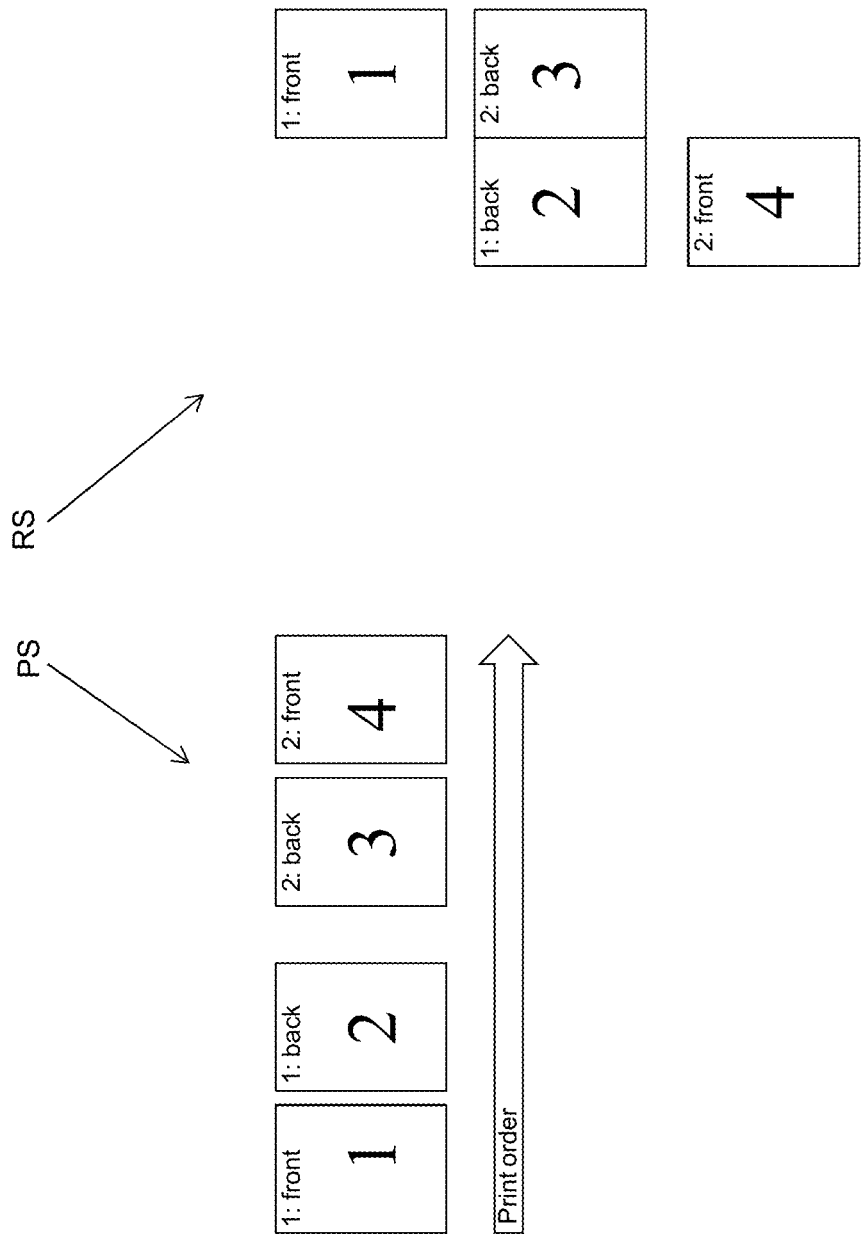
Figure 9:
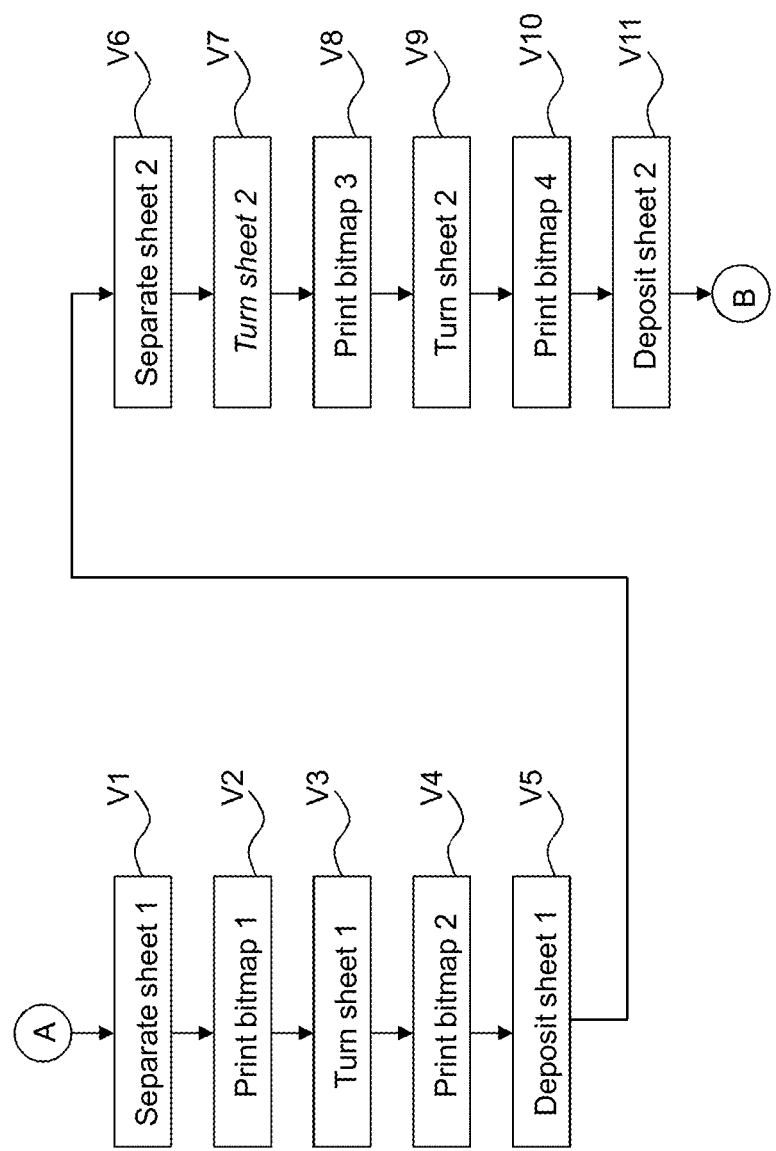

FIG. 6 illustrates a print sequence PS of sides of cut sheets numbered 1 and 2 for duplex printing on both sides of the cut sheets 1, 2. For showing the principle of the method of the present invention, the number of presented cut sheets is equal to 2, but within the scope of the present invention, a larger plurality of cut sheets may be envisioned. The cut sheet numbered 1 has a front side indicated by the text "1: front" and a back side indicated by the text "1: back" and provided with the number "2." The cut sheet numbered 2 has a front side indicated by the text "2: front" and a back side indicated by the text "2: back." The plurality of images to be printed in an end product on subsequent pages on both sides of the cut sheets 1 and 2 are the images provided with large numbers "1", "2", "3" and "4", although any other images may be envisioned. The print order of the plurality of images will now be explained in combination with a flow diagram of a method according to the present invention as shown in FIG. 9. A starting point A leads to a first step V1.

According to the first step V1, the cut sheet numbered 1 is separated from the input holder of the cut sheet printing system and transported to the print engine.

According to a second step V2, a bitmap representing the large number "1" is printed upon the front side of the cut sheet numbered 1.

According to a third step V3, the cut sheet numbered 1 is transported to the turning module and is turned by the turning module.

According to a fourth step V4, the cut sheet numbered 1 is transported again to the print engine and a bitmap representing the large number "2" is printed upon the back side of the cut sheet numbered 1.

According to a fifth step V5, the cut sheet numbered 1 is deposited in the output holder of the cut sheet printing system.

Steps V1-V5 are equal to the steps T1-T5 in FIG. 8.

According to the sixth step V6, the cut sheet numbered 2 is separated from the input holder of the cut sheet printing system and transported to the print engine.

According to a seventh step V7, the cut sheet numbered 2 is transported to the turning module and is turned by the turning module.

According to an eighth step V8, a bitmap representing the large number "3" is printed upon the back side of the cut sheet numbered 2.

According to a ninth step V9, the cut sheet numbered 2 is transported to the turning module again and is turned by the turning module.

According to a tenth step V10, the cut sheet numbered 2 is transported again to the print engine and a bitmap representing the large number "4" is printed upon the front side of the cut sheet numbered 2.

According to an eleventh step V11, the cut sheet numbered 2 is deposited in the output holder of the cut sheet printing system. The method ends in an end point B.

The turning steps V3 and V9 resemble the turning steps of a usual duplex printing by means of a duplex loop module. The turning step V7 is additional and is necessary since printing steps V8 and V10 of the bitmaps representing the numbers "3" and "4" are as in the same printing sequence order in comparison with the normal print steps S7 and S9 in the known printing sequence order in the background art case in FIG. 4.

The resulting reader spread RS (See FIG. 6) shows that the two subsequent pages having the prints of the bitmaps representing the numbers "2" and "3" form a reader spread. The two pages of this reader spread are both printed on the back sides of the cut sheets numbered 1 and 2. In this way, the print quality issue due to printing on different sides of a cut sheet has been avoided. The page order of the pages in the resulting document still conforms to the page order as specified in the document specifications, namely a sequence order of "1", "2", "3" and at last "4."

In case of a larger plurality of cut sheets to be printed, the steps V1-V11 may be repeated accordingly. Parallel processing of cut sheets from the plurality may be envisioned. The cut sheet printing systems 10 and 30 in FIG. 1 and FIG. 3, respectively, are configured to execute the steps V1-V11 of the second embodiment of the method according to FIG. 9. The control units 2 and 32 in FIG. 1 and FIG. 3, respectively, are programmed to execute the steps V1-V11 according to FIG. 9.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for printing a digital document by a cut sheet printing system on a plurality of cut sheets, resulting in an end product having a reader spread formed by two opposing sheets of the plurality of cut sheets, each cut sheet of the plurality of cut sheets having a first side and a second side, the first side having a first print characteristic and the second side having a second print characteristic different from the first print characteristic, wherein the method comprises the step of:

printing each digital image of the digital document intended to be printed on the reader spread in the end product on the side of the corresponding cut sheet of the reader spread that has the first print characteristic, or printing each digital image of the digital document intended to be printed in the reader spread in the end product on the side of the corresponding cut sheet of the reader spread that has the second print characteristic.

2. The method according to claim 1, wherein a first digital image of the digital document is assigned to be printed on the first side of a cut sheet of the plurality of cut sheets and a second digital image of the digital document is assigned to be printed on the second side of the cut sheet, and the plurality of cut sheets is arranged in a cut sheet printing sequence order, the method further comprising the step of:

for the cut sheet, printing the first digital image and the second digital image, respectively, on either side of the cut sheet, wherein the step of printing on the cut sheet further comprises the steps of:

if the cut sheet is of a first mathematical parity in the cut sheet printing sequence order, printing the first digital image on the first side of the cut sheet, and printing the second digital image on the second side of the cut sheet; and if the cut sheet is of a second mathematical parity in the cut sheet printing sequence order, the second mathematical parity being other than the first mathematical parity, printing the second digital image on the first side of the cut sheet, and printing the first digital image on the second side of the cut sheet.

3. The method according to claim 2, further comprising the steps of:
for a cut sheet of the first mathematical parity, swapping the first and second digital image of the cut sheet before printing the cut sheet; and
turning the cut sheet with respect to the first side and the second side after printing on the first and second side of the cut sheet.

4. The method according to claim 2, further comprising the step of, for a cut sheet of the first mathematical parity, turning the cut sheet with respect to the first side and the second side before printing on the first and second side of the cut sheet.

5. The method according to claim 3, wherein the turning of the cut sheet is achieved by a duplex loop module.

6. The method according to claim 4, wherein the turning of the cut sheet is achieved by a duplex loop module.

7. The method according to claim 1, wherein the first print characteristic and the second print characteristic are determined by a media characteristic of the cut sheet.

8. The method according to claim 1, wherein the first print characteristic and the second print characteristic are determined by a difference in the print process between printing on the first side of the cut sheet and printing on the second side of the cut sheet.

9. The method according to claim 8, wherein for a cut sheet of the plurality of cut sheets, the printing on the first side of the cut sheet is done by a first print unit and the printing on the second side of the cut sheet is done by a second print unit other than the first print unit.

10. The method according to claim 1, wherein the first print characteristic and the second print characteristic are determined by the sequence order in which the first and second side of the cut sheet are printed upon.

11. The method according to claim 1, wherein the digital document is a 2-up booklet or a signature.

12. A cut sheet printing system for printing a digital document on a plurality of cut sheets, resulting in an end product having a reader spread formed by two opposing sheets of the plurality of sheets, each cut sheet of the plurality of cut sheets having a first side and a second side, the first side having a first print characteristic and the second side having a second print characteristic different from the first print characteristic, the cut sheet printing system comprising:
at least one print unit configured to print digital images of the digital document on the plurality of cut sheets;
a controller comprising:
a determining mechanism configured to determine at least one digital image intended to be printed on the reader spread in the end product; and
a scheduler configured to schedule each digital image of the digital document intended to be printed in the reader spread in the end product to be printed on the side of the corresponding cut sheet of the reader spread, which side has the first print characteristic, or configured to schedule each digital image of the digital document intended to be printed in the reader spread in the end product to be printed on the side of the corresponding cut sheet of the reader spread, which side has the second print characteristic.

13. The cut sheet printing system according to claim 12, wherein the plurality of cut sheets are arranged in a predetermined cut sheet printing sequence order, and to a cut sheet of the plurality of cut sheets, a first digital image of the digital document is assigned to be printed on the first side of the cut sheet and a second digital image of the digital document is assigned to be printed on the second side of the cut sheet, the printing system further comprising:
a print engine for printing a digital image on a side of a cut sheet of the plurality of cut sheets;
a schedule module configured to schedule the plurality of digital images of the document into the predetermined cut sheet printing sequence order; and
a turning module configured to turn a cut sheet of a first mathematical parity in the cut sheet printing sequence order with respect to the first side and the second side of the cut sheet after printing on the cut sheet, and
wherein the schedule module is configured to swap the first and second digital image assigned to a cut sheet of the first mathematical parity before turning the cut sheet.

14. The cut sheet printing system according to claim 13, wherein the plurality of cut sheets are arranged in a predetermined cut sheet printing sequence order, and to a cut sheet of the plurality of cut sheets, a first digital image of the digital document is assigned to be printed on the first side of the cut sheet and a second digital image of the digital document is assigned to be printed on the second side of the cut sheet, the printing system comprising:
a print engine for printing a digital image on a side of a cut sheet;
a schedule module configured to schedule the plurality of digital images of the document into the predetermined cut sheet printing sequence order; and
a turning module configured to turn a cut sheet of a first mathematical parity in the cut sheet printing sequence order with respect to the first side and the second side of the cut sheet before printing on the cut sheet.

15. The cut sheet printing system according to claim 12, further comprising a duplex loop module for enabling duplex printing of a cut sheet, wherein the duplex loop module comprises the turning module.

16. The cut sheet printing system according to claim 13, further comprising a duplex loop module for enabling duplex printing of a cut sheet, wherein the duplex loop module comprises the turning module.

17. A non-transitory recording medium comprising computer executable program code configured to instruct at least one computer to perform the method according to claim 1.

* * * * *